T. A. WILLARD.
POROUS TUBE FOR STORAGE BATTERIES.
APPLICATION FILED NOV. 8, 1915.
1,243,371. Patented Oct. 16, 1917.
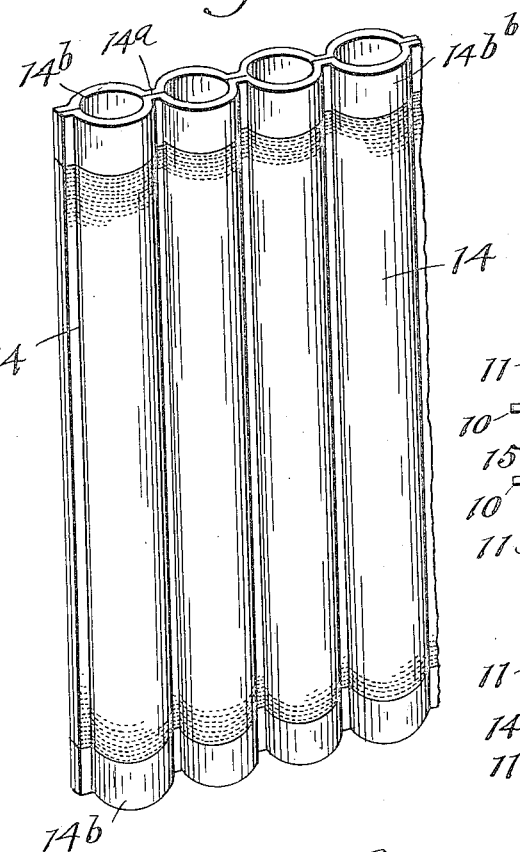
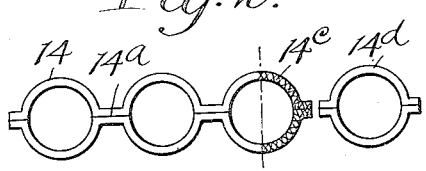
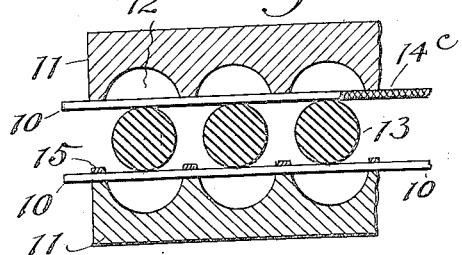
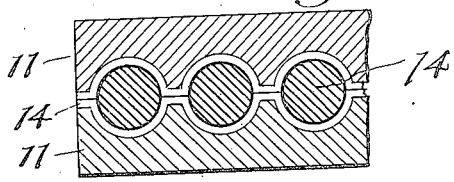
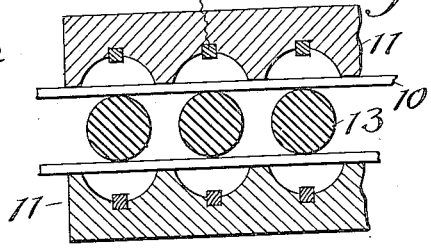
Inventor
Theodore A. Willard
by Thurston & Kwis
Attys

UNITED STATES PATENT OFFICE.

THEODORE A. WILLARD, OF CLEVELAND, OHIO.

POROUS TUBE FOR STORAGE BATTERIES.

1,243,371. Specification of Letters Patent. Patented Oct. 16, 1917.

Application filed November 8, 1915. Serial No. 60,425.

*To all whom it may concern:*

Be it known that I, THEODORE A. WILLARD, a citizen of the United States, residing at Cleveland, in the county of Cuyahoga and State of Ohio, have invented a certain new and useful Improvement in Porous Tubes for Storage Batteries, of which the following is a full, clear, and exact description.

This invention relates to porous tubes for storage batteries.

It has heretofore been proposed by me to produce storage battery separators, first, by building up a block or body of rubber and porous material, such as may be formed of alternate layers of rubber and porous material or of layers of rubber-coated fabric or other suitable fibrous or porous material, and then slicing the block or body into sections with the porous material extending directly therethrough so as to form very minute pores which are uniformly distributed and extend directly from one side of the separator to the other. With sections cut from a block or body so formed I may form separators of any of the well known types or shapes, such as the corrugated, ribbed or tubular types. The above is disclosed and claimed in my prior applications No. 848,296, filed June 30, 1914, and No. 5,588, filed February 1, 1915.

The subject-matter of the present invention consists in a porous tube or series of connected porous tubes preferably formed from plates or sections of rubber and porous material such as briefly referred to above.

My invention may be briefly summarized as consisting in certain novel details of construction of the porous tube and certain novel steps of a new and improved method of producing the same.

In the accompanying sheet of drawings wherein I have shown the tube formed in accordance with my invention and also the preferred way of producing it, Figure 1 is a tubular unit composed of a series of connected tubes formed in accordance with the present invention; Fig. 2 is an end view of the same; Fig. 3 is a view illustrating molds about to be closed onto separator material to form the tubes; Fig. 4 is a similar view after the molds are closed; Fig. 5 is a view similar to Fig. 3 showing a slight modification, wherein the tubes are provided with lateral spacing ribs or flanges; Fig. 6 is an end view of a series of tubes formed in the manner shown in Fig. 5; and Fig. 7 is a view showing a portion of cores which are utilized with the molds shown in Figs. 3 and 5.

In forming the porous tubes, or a series or unit composed of a predetermined number of the porous tubes in accordance with my invention, I employ two plates or sections 10 of the separator material which are preferably sections composed of rubber and uniformly distributed porous material, such as are formed by cutting the block or body built up of rubber and porous material in the manner fully disclosed in my prior applications. These separator sections will, of course, be cut at right angles to the layers of porous material and will be of predetermined thickness and of width and length which will depend upon the length of the tubes to be formed and the number of tubes which are to be formed in a series. These sections, when cut and before being placed in the molds to form the tubes, are preferably semi-vulcanized and are soft and flexible. However, in the broad aspect of my invention these plates or sections 10 may be otherwise formed and may consist of other material or materials.

In forming these tubes I employ two complementary mold sections 11 with oppositely disposed semi-circular grooves 12, and I employ with these mold sections circular cores 13. The number of the cores and the number of the pairs of grooves 12 will depend upon the number of tubes to be formed in a series which can be varied to suit the requirements or the exigencies of any particular case. I have successfully formed in a plate or series sixteen tubes, although a greater or less number may be formed at each molding operation.

The two separator sections 10 with the intervening cores 13 are placed between the mold sections 11 which are then brought together and are very tightly compressed, compressing the separator sections between the cores and along the longitudinal margins of the outside tubes of the series. Then the mold is placed in a vulcanizer until the tubes are hardened and the plates thoroughly vulcanized together longitudinally of the tubes on both sides thereof, after which the mold can be opened and the cores and tubes withdrawn. This produces a series of porous tubes 14 connected by the short webs 14ᵃ where the two plates are vulcanized together.

After the unit or series of connected tubes are removed from the molds the longitudinal outside margins are trimmed off, leaving flanges at the outer sides of the end tubes as well as the webs 14ᵃ between the tubes.

For the purpose of securing vulcanization of the two plates forming the tubes, I prefer to place on one of the plates, where it is to be pressed against the other, strips of rubber 15, this being unnecessary of course when the plates consist of solid or unperforated rubber and is preferably employed when the plates are composed of the rubber and porous or fibrous material which, as before stated, is the material which I preferably and generally employ. However, I do not regard it as absolutely necessary to use the solid rubber vulcanizing strip 15, for with my improved separator sections 10 composed of rubber and porous material there is sufficient rubber in the sections to securely vulcanize the two plates togther providing the mold sections are compressed with sufficient pressure.

For the purpose of strengthening the tubes formed of the two separator plates or sections composed of rubber and fibrous or porous material, I prefer to employ along one or both end edges of the plates strips of solid or non-porous rubber so that when the tubes are formed there is provided at one, and preferably at both ends, the non-porous hard rubber end portions 14ᵇ containing none of the porous material. However, the major portion of the tube between the end portions 14ᵇ is porous due to the presence of the short threads or fibers, the ends of which are indicated in Fig. 1 and the manner in which they extend through the separator sections and hence through the wall of the tube being indicated in Figs. 2 and 3 by the reference character 14ᶜ.

The series of tubes thus formed may be used in a battery without disconnecting the tubes, but if it is desired to employ separate tubes so that the electrolyte can entirely surround the tubes they may be cut or divided through the connecting webs 14ᵃ. The right hand tube of Fig. 2 here designated 14ᵈ is shown as severed from the remainder. When the tubes are thus separated or divided each is provided with diametrically opposite short flanges or ribs which can, if desired, be employed as spacers. When the tubes are to be divided, the webs between the tubes are preferably made somewhat longer than the webs connecting the tubes which are to be used as a unit without being separated. Thus in Fig. 2 the connecting webs are somewhat longer than shown in Fig. 1.

As before stated, when the tubes are separated or divided into tubular sections spacing flanges or ribs are formed on each tube. When these separated tubes are placed in the battery the flanges are very effective for separating from the tubes flat separators which can be employed with these porous tubes if desired, although the separators are not necessary unless the tubes are perforated as has been done heretofore.

In the event that the tubes are used in a series, as shown in Figs. 1 and 6, and in the event that with each series of tubes it is desired to employ lateral spacers, such as shown at 14ᵉ in Fig. 6, these can be provided during the molding and vulcanizing process by using special molds having at the base of the semi-circular grooves 12 longitudinal slots or grooves and by placing in these slots strips of solid rubber 16 which will adhere to and become firmly vulcanized to the tubes forming the lateral spacers 14ᵉ.

With this process, as above described, the tubes can be produced very rapidly and inexpensively and at the same time the tubes are very strong and durable, and by reason of the fact that they have the closely associated numerous minute pores are admirably adapted for inclosing the electrodes of certain types of storage batteries.

Having thus described my invention, what I claim is:—

1. A porous tube for storage batteries, composed of two half sections, each containing porous material extending from one surface of the tube to the other and secured together at diametrically opposite points the full length of the tube.

2. A porous tube for storage batteries having porous material extending through the same from one surface to the other and having diametrically opposite longitudinally extending flange portions.

3. A porous tube for storage batteries composed of two half sections composed of rubber and porous material extending therethrough and having at diametrically opposite points laterally projecting portions with the adjacent faces secured together the full length thereof.

4. A series of porous tubes for storage batteries composed of a pair of plates formed of rubber and porous material extending through the same, said plates having oppositely disposed semi-circular portions with flat connecting portions which are also oppositely disposed and are secured together the full length of the tubes.

5. A porous tube composed of rubber and porous material extending through the same and having at one or both ends a non-porous portion.

6. A tube for storage batteries composed of porous body portion formed of rubber and porous material extending from the outer surface to the inner surface and having one or both end portions formed of hard solid rubber.

7. A series of porous tubes for storage batteries having integral connecting portions and having longitudinally extending ribs located substantially midway between the portions connecting adjacent tubes.

8. A series of porous tubes for storage batteries formed of rubber and porous material extending therethrough, the tubes being connected together by flange-like connecting portions and being provided with longitudinally extending ribs projecting from the tubes midway between and at right angles to the connecting portions.

9. A series of tubes for storage batteries having integral connecting portions and each being provided with porous material extending from one surface of the tube to the other.

In testimony whereof, I hereunto affix my signature.

THEODORE A. WILLARD.